March 26, 1968     F. H. REDWINE     3,374,669
DRILLING RATE LOGGER
Filed Dec. 23, 1964     3 Sheets-Sheet 1
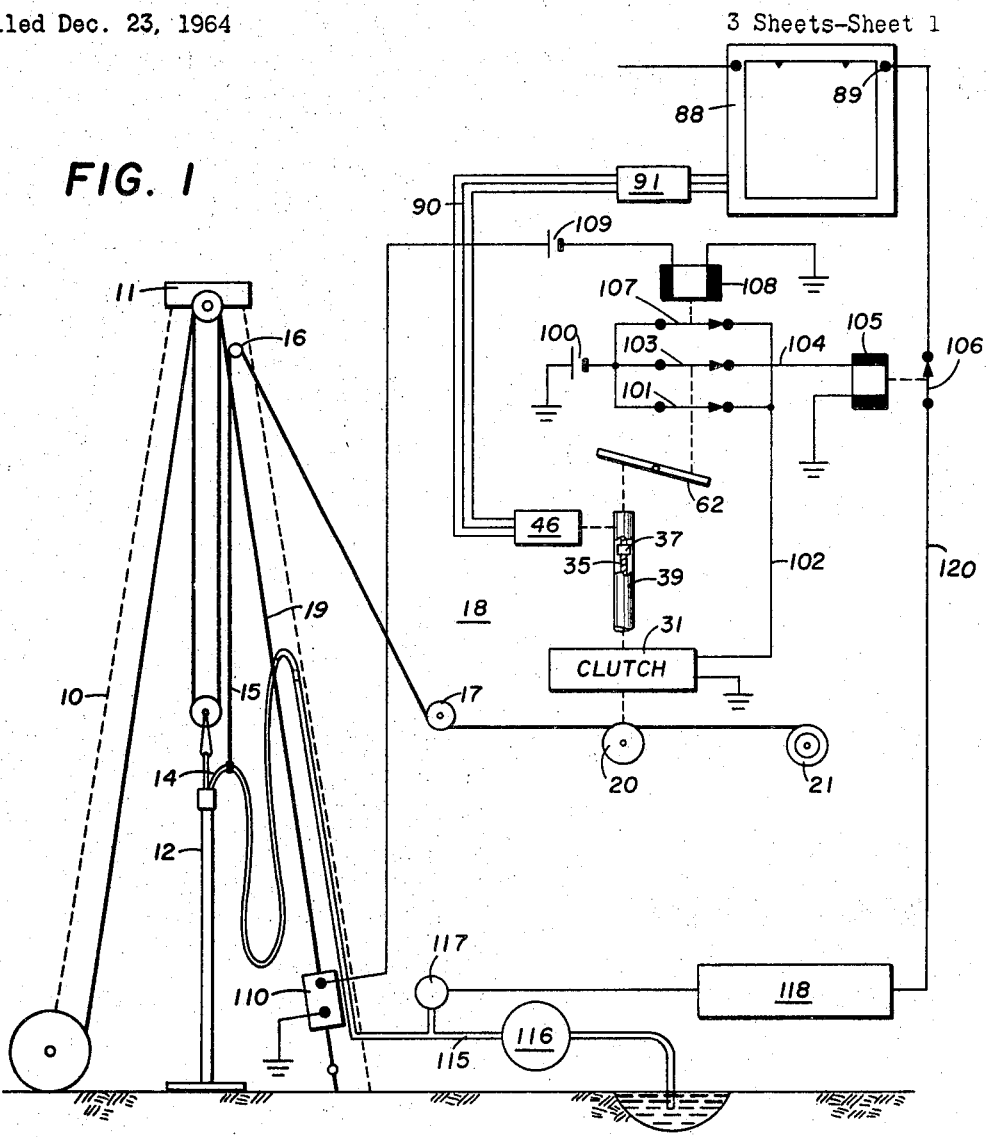
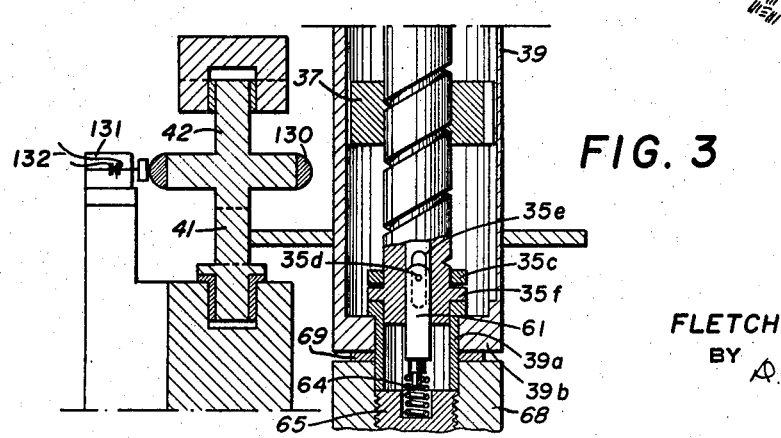
INVENTOR
FLETCHER H. REDWINE
BY
ATTORNEY

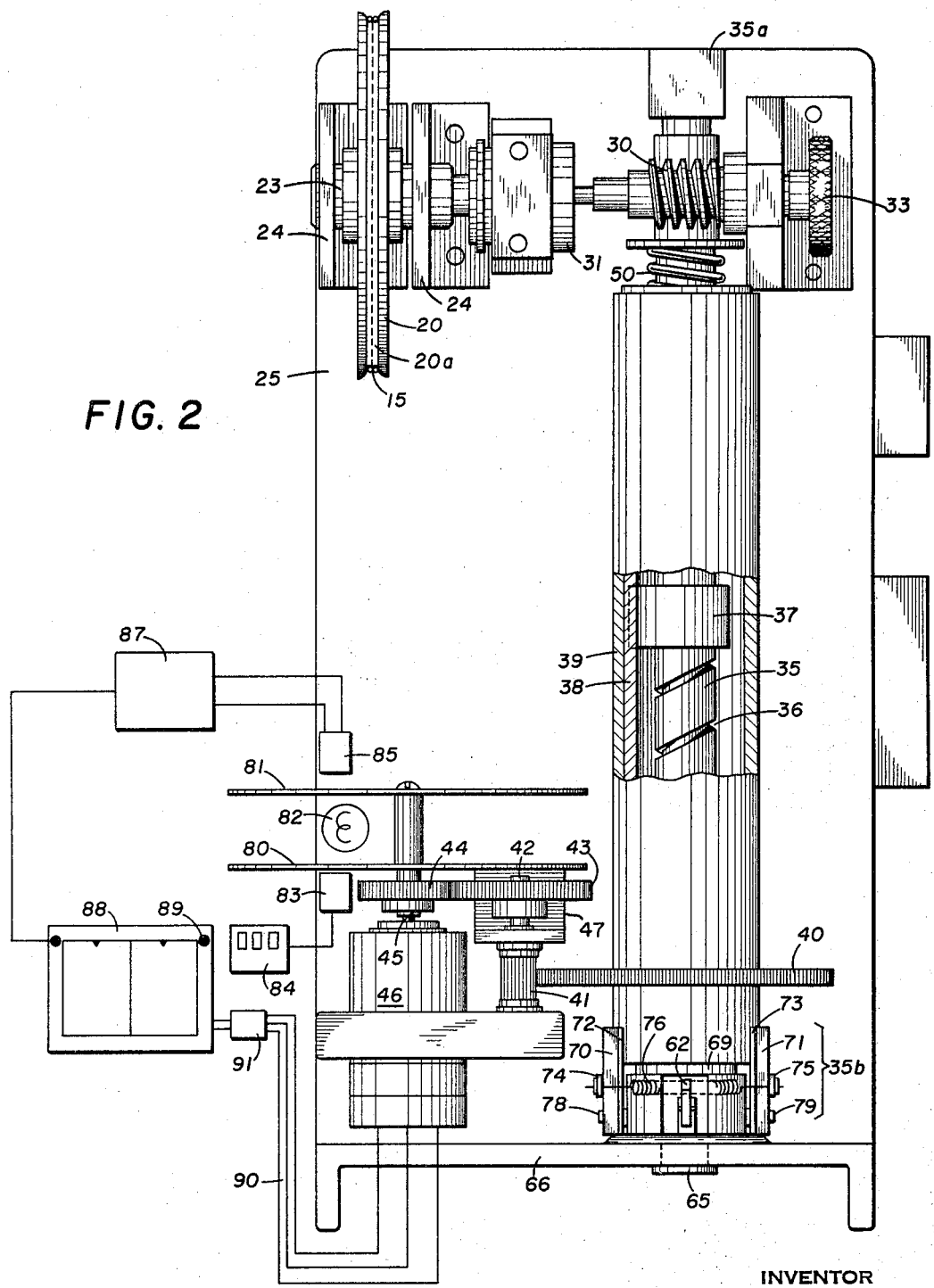

INVENTOR
FLETCHER H. REDWINE

United States Patent Office 3,374,669
Patented Mar. 26, 1968

3,374,669
DRILLING RATE LOGGER
Fletcher H. Redwine, Irving, Tex., assignor to Arps Corporation, Garland, Tex., a corporation of Delaware
Filed Dec. 23, 1964, Ser. No. 420,554
9 Claims. (Cl. 73—151.5)

ABSTRACT OF THE DISCLOSURE

A penetration rate recording system has a depth line attached to a drill string support which is repeatedly moved from adjacent to the derrick floor to a region of the crown block. The depth line passes over a depth line sheave disposed in the region of the crown block, and also passes over a measuring sheave provided to measure the movement of the depth line. A lead screw is connected to the measuring sheave to rotate in response to the measured movement of the depth line. A traveling nut is mounted on the lead screw and is keyed to a cylinder for slide movement relative thereto, but constrained against rotation relative to the cylinder. A pulse generator is driven by the cylinder and a recorder driven in proportion to the rotation of the cylinder records the generator pulses as an indication of the rate of penetration as a function of depth.

---

This invention relates to measuring and recording the rate at which a drill penetrates a formation, and in a more specific aspect, relates to a memory and a control system for establishing and maintaining an accurate depth function.

In drilling for oil and the like, earth formations are penetrated by a rotary drill bit. In the past the total depth reached by the bit at any time during the drilling operation has been reckoned by measurement of the lengths of the stands of drill stem forming the drilling string. More recently, borehole depths have been sensed during drilling operations in accordance with systems and procedures such as disclosed in Patents Nos. 2,365,014, 2,539,758, and 2,688,871.

However, there is a need for a versatile depth measuring system which would operate independently of any operation required of the driller, and which will maintain an accurate representation of total depth. The present invention is directed to a system which will generate an output function only when a drill bit is on bottom and making hole, and which will permit all the usual and necessary operations in and around the drill rig without impeding the same.

More particularly, in accordance with the present invention, there is provided a depth measuring system for a drill. A depth line is adapted to be attached to the drill. A measuring sheave is provided over which the depth line passes to produce rotation in proportion to the movement of the drill. A lead screw is driven by the sheave and has a cylinder encompassing the lead screw, with end plates on the cylinder. A following on the lead screw is keyed to the cylinder and slides through the cylinder for transfer of rotation to the cylinder from the lead screw only when the follower contacts one end plate in the cylinder. A rotatable output means is coupled to the cylinder for transmission over rotational motion thereof. A control unit is provided for decoupling the measuring sheave from the lead screw when no part of the weight of the drill string is supported by the drawworks. Thus, the lead screw and the follower nut serve as a position memory device responsive to movement of the depth line at any time the drill string is supported by the drawworks.

In a further aspect of the invention, a system is provided for logging a borehole while drilling wherein formation-dependent signals are produced at the earth's surface in the course of the drilling operations. A recorder is driven in accordance with the depth function above discussed. The formation-dependent signal is applied to the recorder. In response to elevation of the drill bit above hole bottom, the formation-dependent signal is decoupled from the recorder. Thus, formation-dependent information will be applied to the recorder only when the drill bit is on hole bottom.

For a more complete understanding of the present invention and for further objects and advantages thereof, reference may now be had to the following description taken in conjunction with the accompanying drawings in which:

FIGURE 1 schematically illustrates a penetration rate sensing and memory system of the present invention;

FIGURE 2 is a front view of one embodiment of the rate sensing unit;

FIGURE 3 is a detailed illustration of one end of the memory system with a modified form of read-out.

Figure 4:
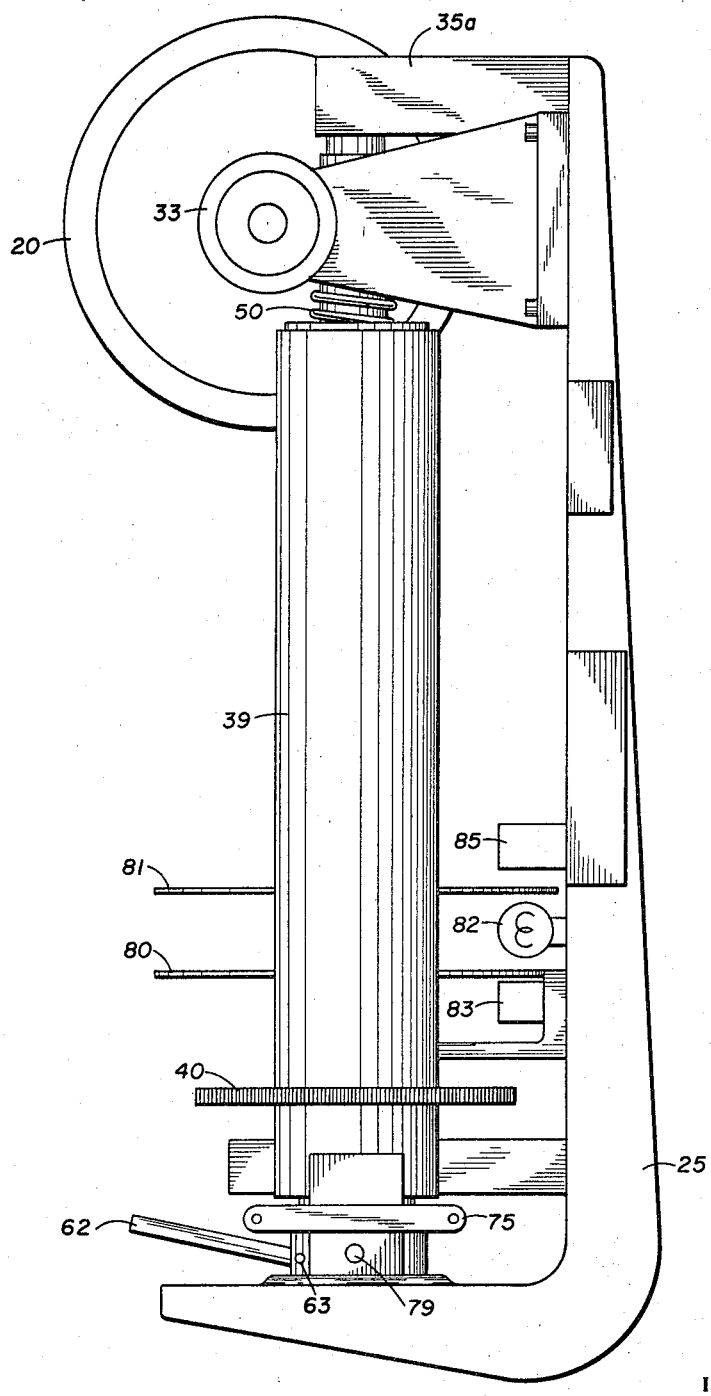
FIGURE 4 is a side view of the unit of FIGURE 2.

In FIGURE 1 a derrick involved in drilling a well is represented by the dotted frame 10. The derrick 10 is provided with a crown block 11 from which a drill pipe 12 is suspended. Suitable power for the drawworks mechanism is provided for raising and lowering the drill stem 12 into the borehole. A turntable on the derrick floor is powered to rotate the drill stem 12. In the course of drilling operations, it is desirable to be able to known at any instant the depth of the drill bit at the end of the drill stem 12 and the rate at which the drill penetrates the formations. Further, in accordance with logging techniques disclosed in the Patents Nos. 2,524,031 and 2,658,284 to Arps, a signal is produced while drilling which is to be recorded as a function of depth. Thus, a depth function is an essential parameter to be used in connection with drilling operations.

The present invention is directed to a system for accurately generating a reliable depth function, i.e., proportional to total depth, and which, at the same time, will permit the drill stem 12 to be raised and lowered in the borehole to add drill pipe as required in the drilling program. The system of the present invention is provided with a memory which will accommodate the necessary drilling operations and will provide an accurate indication of the depth of the drill bit when at hole bottom.

As illustrated in FIGURE 1, a depth line 15 is secured to the upper end of the drill stem 12. The connection conveniently may be made to the goose neck on the swivel 14. The depth line 15 extends upward over a sheave 16 and then downward to a sheave 17 which is secured to a logging unit 18. The depth line 15 passes over a measuring sheave 20 and then to a spring-driven unit 21 which retrieves or reels in any slack in the depth line and thus maintains the depth line 15 under tension as it passes over sheave 20.

The measuring sheave 20 is a part of a depth control unit 18 of the present invention. The sheave 20 is shown in its diagrammatic and funtcional relationship in FIGURE 1, while in FIGURES 2 and 3 the sheave 20 and its associated components are illustrated in greater detail. The sheave 20, FIGURE 2, is mounted on a shaft 23 which is journaled in supports 24 which are mounted on a base plate 25. The sheave 20 is provided with a groove 29a in which the depth line 15 runs. Shaft 23 is coupled to a worm 30 by way of a magnetic clutch 31. The clutch may be selectively energized or de-energized by actuation of a control circuit later to be described. A knob 33 is mounted on the end of the shaft 23 which carries worm 30.

The worm 30 drives a wormgear (not shown) mounted at the upper end of a lead screw 35. The lead screw 35 is journaled in a bearing in block 35a and extends downwardly to a bearing unit 35b. The lead screw has a single thread 36 cut therein. A follower nut 37 travels along the lead screw 25 and is keyed to a spline 38 which is mounted on the inner wall of a cylinder 39. The cylinder 39 is so mounted on lead screw 35 that the lead screw 35 may rotate relative to the cylinder 39 so long as the nut 37 is not in contact with the end plate at either end of the cylinder 39. The mechanical coupling between the sheave 20 and the lead screw 35, and the pitch of the lead screw are proportioned to drive the follower nut 37 less than the length of the cylinder 39 for a movement of the drill steam 12 from the derrick floor to the crown block 11.

In operation, the traveling nut 37 is controlled in position such that it will engage a bottom plate in the cylinder 39, thereby to impart rotational motion from the lead screw 35 through the nut 37 to the cylinder 39. The cylinder 39 carries a gear 40 near the lower end thereof which meshes with a pinion 41. Pinion 41 is mounted on shaft 42 and drives a gear 43 which in turn meshes with a gear 44 mounted on a shaft 45 leading to the driveshaft of a selsyn transmitter 46. Transmitter 46 is mounted on a bracket 47 secured to the base plate 25.

The purpose of the mechanism thus far described is to permit the measuring sheave 20 to be rotated in both directions but to impart motion in only one direction to the selsyn transmitter 46. This will permit the drill stem 12 of FIGURE 1 to be raised and lowered at the will of the operator. As the traveling block of the drawworks is raised, the nut 37 moves up the lead screw 35. Only when the nut 37 returns to the bottom plate in the cylinder 39 will the gear train at the output thereof be rotated. A spring 50 is mounted at the upper end of the cylinder 39 and encircles the lead screw 35 to minimize longitudinal or axial play in the system.

As illustrated in FIGURE 3, a bearing 39a is positioned in the end plate 39b of the cylinder 39. A washer 35c is pinned to the lead screw 35 by a pin 35d which passes through a slot 35e in the lower end of lead screw 35. The washer 35c is slidable along the lead screw 35 over the length of the slot 35e. A thrust plate 35f is integral with the lead screw 35 between the upper surface of bearing 39a and the lower surface of the washer 35c. A thrust bearing 69 is positioned between the end of the cylinder 39 and the upper surface of the block 68 in which the bearing 39a is mounted. A push rod 61 is coupled at its upper end to the pin 35d and extends downward into engagement with a lever arm 62 which is pivoted on a pin 63, FIGURE 4. A spring 64 extends from a cap 65, FIGURE 2, on the outer face of the bottom plate 66 into engagement with the underside of the lever arm 62 to maintain the lever arm 62 in engagement with the lower end of the push rod 61. Thus, the spring 64 maintains the end of the lever 62 against the push rod so that when the measuring sheave 20 is driven in a reverse direction, the washer 35c will be raised off thrust plate 35f as the nut 37 travels up along the lead screw 35. However, as the measuring sheave is again driven in the forward direction, the nut 37 travels downward on the lead screw, and the washer 35c is again forced against the thrust plate 35f. When the washer 35c is forced by nut 37 against the thrust plate 35f, the rotational motion of the lead screw 35 is transmitted to the cylinder 39 so that the gear 40 drives the pinion 41. With this construction, the motion of lead screw 35 will be transmitted to cylinder 39 only when the nut 37 is at the bottom of the lead screw 35. The drill stem may be raised to move the drill bit off of the bottom of the borehole. Only when the drill bit returns to the hole bottom and makes additional hole will the cylinder 39 be rotated.

A drag brake shown in FIGURE 2 is mounted on the lower end of the cylinder 39 and comprises plates 70 and 71. The plates are provided with suitable wear plates or layers 72 and 73, such as of nylon or the like. A pair or ribs 74 and 75 extend beyond the periphery of the cylinder 39 and are provided with springs, such as spring 76, to maintain the plates of the drag brake in contact with the surface of the cylinder 39 to prevent any backlash or reverse movement of the cylinder 39 as the nut 37 starts its travel upward along the lead screw 35. The elements of the drag brake are mounted on pins 78 and 79.

In one embodiment of the invention, the measuring sheave 20 was 1.5 feet in circumference. For each revolution of the measuring sheave 20, the gear 43 made one revolution. This motion was reduced or stepped down to the gear 44 so that the shaft 45 made one revolution per foot of travel of the depth line 15.

A pair of disks 80 and 81 are mounted on shaft 45. The disk 80 is provided with one hole therein which is located as to be in registration with a lamp 82 and a photocell 83. Thus, the photocell 83 provides one output pulse per foot of depth. Photocell 83 is connected to a depth counter 84 which registers, at any time, the total depth of penetration of the drill bit.

A plurality of holes are formed in the second disk 81 and are in registration with the lamp 82 and a second photocell 86. Thus, a train of pulses is produced at the output of the photocell 86 which is applied to a frequency-to-voltage converter 87. The latter output signal from converter 87 is then applied to a first input channel on a dual-channel recorder 88 and is a drilling rate function recorded as a function of borehole depth. The second input of the recorder 88 is then driven in accordance with a formation-dependent signal as produced in accordance with the aforementioned Arps patents and thus is recorded as a function of depth. The transmitter 46 is coupled by channels 90 to a receiver 91 which is coupled to the chart drive on recorder 88 so that chart length is proportional at any instant to total depth.

As shown in FIGURE 1, when the drill is on the bottom and drilling operations are underway, the lever 62 serves to close a circuit which will maintain a voltage on the clutch 31 so that the motion of the depth line 15 will always be transmitted through the lead screw 35, nut 37 and cylinder 39 to the selsyn transmitter 46. More particularly, a voltage source such as battery 100 is connected at one terminal to ground and at a second terminal to the arm of a switch 101. The circuit from switch 101 extends by way of conductor 102 to one terminal of the clutch 31. The second terminal of the clutch 31 is grounded. Thus, when the switch 101 is closed, the clutch 31 is energized. A second switch 103 is connected to the battery 100 and leads by way of conductor 104 to a relay coil 105. The second terminal of relay 105 is connected to ground. Relay 105 controls a switch 106, the operation of which will be explained in connection with operation of recorder 88.

The battery 100 is also connected to a third switch 107 which leads by way of conductor 102 to the clutch 31. The switch 107 is connected in parallel with switch 101 and is controlled by a relay coil 108. Relay 108 is energized from a source 109 under control of a deadline sensor unit 110.

When it is necessary to add a length of pipe into the drill stem, or for any other reason to raise the drill stem off the bottom of the hole, the depth line will raise the nut 37 thereby permitting the lever 62 to open one energizing switch, i.e., switch 101, for the clutch 31. However, when the bit is raised off bottom, the energization of the clutch 31 is controlled by the transducer 110 on the deadline leading from the crown block. So long as the weight is present on the deadline 19, the clutch 31 will be energized by way of switch 107. If a joint of drill pipe is to be added, a driller raises the pipe to elevate the kelly above the drill floor. The drill stem is then supported in slips. As the drill pipe is lowered into the slips, the weight on the deadline 19 is greatly reduced. This causes the transducer 110 to actuate relay coil 108 to open the second switch in the clutch energizing circuit. So long as the weight of the drill stem is not applied to the deadline, switch 107 will be open and the clutch 31 will be deenergized. Any movement of the drawworks in picking up and adding a new length of drill pipe, or in connection with any other operation on the drill floor, will not affect the data stored in the memory of the depth measuring system. However, as soon as the new length of pipe is connected onto the drill stem and the weight of the drill stem is raised off the slips, the transducer 110 energizes the clutch 31 so that any further movements are automatically entered into the memory system. Thus, as the drill again arrives at the hole bottom, the traveling nut 37 arrives at the bottom of cylinder 39. Any further downward movement of the drill stem is accompanied by rotation of the cylinder 39.

It is often the practice to lift the drill bit off bottom and raise and lower the same in the course of drilling a given section even though a logging operation is being conducted in accordance with the above Arps patents. Such measurements, made during the course of drilling, for recording on the recorder 88, may be produced by converting pulses in the output line 115 from a mud pump 116. A sensor 117 applies mud line pulse information to a frequency-to-voltage converter 118, the output of which is applied by way of line 120 and switch 106 to the second terminal 89 of recorder 88. Indications on the chart on recorder 88, that are representative of formations other than at the hole bottom, are undesirable. Superposition on the already recorded data of some spurious spike or signal is also undesirable. To avoid recording such information, the operation of the lever 62 also serves to open the switch 106 in line 120 leading to the recorder 88. Thus, only when the bit is on bottom and drilling operations are underway is logging data on line 120 applied to the recorder 88.

While a photoelectric pickoff unit including disks 80 and 81 is shown in FIGURE 2, it is to be understood that other modes of pickoff may be employed. For example, as shown in FIGURE 3, the gear 40 drives a pinion 41 which is mounted on shaft 42. In this embodiment, a cam unit 130 is mounted on shaft 42 and serves to close contacts of a switch unit 131 once each revolution of the shaft 42. The cam 130 may have a plurality of uniformly spaced points on its periphery so that a plurality of pulses may be produced on the output channels 132 for each revolution of shaft 42.

The control system shown in FIGURE 1 is to be taken as representative of suitable specific forms of control. However, the essential functions involved in carrying out the present invention are illustrated in the system of FIGURE 1.

While modifications may be made in various specific features of the invention, it will be seen that the invention is employed with an oil well drill wherein a traveling block supports a drill string and is repeatedly moved from adjacent to a derrick floor to the region of a crown block. A depth line is attached to move with the traveling block over a depth line sheave mounted in the region of said crown black. A retriever controls the depth line as it travels over a measuring sheave. A lead screw is coupled to the measuring sheave for rotation proportional to the rotation of the sheave. A cylinder encompasses the lead screw and is mounted for rotation coaxially with respect to the lead screw. A traveling nut on the lead screw is retrained from rotation relative to the cylinder so that motion of the lead screw will be transmitted to the cylinder only when the nut is in contact with an end of the cylinder. Measuring means are coupled to the cylinder for rotation only when the nut is at one end of said cylinder. Thus, the depth line may be moved bi-directionally with the cylinder being moved only uni-directionally. A generator driven by the cylinder produces an output proportional to cylinder rotation, which output may then be recorded as a function of depth.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a depth system for an oil well drill wherein supporting means for a drill string may be repeatedly moved from adjacent to a derrick floor to the region of a crown block, the combination which comprises:
    (a) a depth line adapted to be attached to said supporting means,
    (b) a depth line sheave in the region of said crown block,
    (c) a retriever onto which said depth line is secured and a measuring sheave over which said depth line passes in traveling to and from said retriever,
    (d) a lead screw coupled to said measuring sheave for rotation thereof proportional to the rotation of said sheave,
    (e) a cylinder encompassing said lead screw and mounted for rotation coaxially with respect to said lead screw,
    (f) a traveling nut on said lead screw and spline-connected to the inside of said cylinder for restraint from rotation relative to said cylinder and for slide movement relative to said cylinder, and
    (g) measuring means coupled to said cylinder for producing output rotation only when said nut is at one end of said cylinder whereby said depth line may be moved bi-directionally with said cylinder being moved only uni-directionally.

2. The combination set forth in claim 1 in which the coupling between said measuring sheave and said lead screw, and the pitch on said lead screw, are proportioned to drive said nut less than the length of said cylinder upon movement of said supporting means from said derrick floor to said crown block.

3. The combination set forth in claim 1 in which there is:
    (a) a pulse generator driven by said cylinder,
    (b) a recorder having a chart drive coupled to said cylinder and driven in proportion to rotation of said cylinder, and
    (c) a pulse-frequency-to-voltage converter connected between said pulse generator and said recorder for recording drilling rate as a function of depth on said recorder.

4. The combination of:
    (a) a depth line which moves in accordance with the movement of a drill stem through a turntable,
    (b) a measuring sheave over which said depth line passes to produce sheave rotation proportional to movement of said depth line,
    (c) a lead screw having a clutch forming a coupling to said sheave,
    (d) a cylinder encompasing said lead screw,
    (e) a traveling nut mounted on said lead screw and keyed to said cylinder,
    (f) a pulse generator driven by said cylinder,
    (g) a transducer responsive to a predetermined weight level on a line supporting said drill stem to energize said clutch for transmission of motion of said sheave to said lead screw to drive said traveling nut to the end of said cylinder for engaging said cylinder to transmit motion to said pulse generator, and
    (h) a recorder having a recorder chart driven in proportion to rotation of said cylinder and including a recording element coupled to said generator for recording pulses from said generator thereby indicating rate of penetration as a function of depth.

5. A system for measuring the depth of a drill string which comprises:
   (a) a depth line adapted to be attached to said drill string,
   (b) a measuring sheave over which said line passes for rotation thereof proportional to movement of said drill string,
   (c) a lead screw driven by said sheave,
   (d) a cylinder having end plates and encompassing said lead screw,
   (e) a follower on said lead screw for movement through said cylinder and keyed to said cylinder to prevent relative rotation thereof and for rotating said cylinder with said lead screw only when said follower contacts one of said end plates, and
   (f) rotatable output means coupled to said cylinder for transmission of rotational motion therefrom.

6. A penetration rate recorder responsive to movement of a depth line which comprises:
   (a) a measuring sheave over which said depth line passes to produce sheave rotation proportional to movement of said depth line,
   (b) a lead screw having a clutch forming a coupling to said sheave,
   (c) a cylinder encompassing said lead screw,
   (d) a traveling nut mounted on said lead screw and keyed to said cylinder,
   (e) a pulse generator driven by said cylinder,
   (f) means selectively to energize said clutch for transmission of motion of said sheave to said lead screw selectively to drive said traveling nut to the end of said cylinder where said traveling nut engages said cylinder to transmit motion from said sheave to said pulse generator, and
   (g) a recorder having a recorder chart driven in proportion to rotation of said cylinder and including a recording element coupled to said generator for recording the generator pulses as an indication of the rate of penetration as a function of depth.

7. A penetration rate recorder responsive to movement of a depth line which comprises:
   (a) a measuring sheave over which said depth line passes to produce sheave rotation proportional to movement of said depth line,
   (b) a lead screw having a clutch forming a coupling to said sheave,
   (c) a cylinder encompassing said lead screw,
   (d) a traveling nut mounted on said lead screw and keyed to said cylinder,
   (e) a pulse generator driven by said cylinder,
   (f) means selectively to energize said clutch for transmission of motion of said sheave to said lead screw selectively to drive said traveling nut to the end of said cylinder where said traveling nut engages said cylinder to transmit motion from said sheave to said pulse generator, and
   (g) recorder means adapated to receive a recorder chart and coupled to said cylinder to drive said chart in proprotion to rotation of said cylinder and further including a recording element connected to said generator for recording pulses from said generator to thereby indicate rate of penetration as a function of depth.

8. A system for measuring the depth of a drill string as sensed by movement of a depth line adapted to be attached to said drill string which comprises:
   (a) a measuring sheave over which said depth line passes to produce sheave rotation proportional to movement of said drill string,
   (b) a lead screw driven by said sheave,
   (c) a cylinder having end plates and encompassing said lead screw,
   (d) a follower on said lead screw keyed to said cylinder for movement through said cylinder and for rotating said cylinder with said lead screw only when said follower contacts one of said end plates, and
   (d) rotatable output means coupled to said cylinder for transmission of rotational motion therefrom.

9. A system for measuring the depth of a drill string as sensed by movement of a depth line adapted to be attached to said drill string which comprises:
   (a) a measuring sheave over which said depth line passes to produce sheave rotation proportional to movement of said drill string,
   (b) a lead screw driven by said sheave,
   (c) a cylinder having end plates and encompassing said lead screw,
   (d) a follower on said lead screw keyed to said cylinder for movement through said cylinder and for rotating said cylinder with said lead screw only when said follower contacts one of said end plates, and
   (e) an output chart recorder coupled to said cylinder for driving the recorder chart proportional to depth.

References Cited

UNITED STATES PATENTS

| | | | |
|---|---|---|---|
| 2,330,753 | 9/1943 | Sikes | 73—151.5 |
| 2,671,346 | 3/1954 | Banning | 73—151.5 |

RICHARD C. QUEISSER, *Primary Examiner.*

JAMES J. GILL, *Examiner.*

J. W. MYRACLE, *Assistant Examiner.*

UNITED STATES PATENT OFFICE
CERTIFICATE OF CORRECTION

Patent No. 3,374,669                              March 26, 1968

Fletcher H. Redwine

It is certified that error appears in the above identified patent and that said Letters Patent are hereby corrected as shown below:

Column 1, line 59, "following" should read -- follower --. Column 2, line 29, "known" should read -- know --; line 60, "funtcional" should read -- functional --. Column 3, line 4, after "screw" insert -- 35 --; line 6, "25" should read -- 35 --; line 15, "steam" should read -- stem --. Column 5, line 61, "black" should read -- block --; line 67, "retrained" should read -- restrained --.

Signed and sealed this 12th day of August 1969.

(SEAL)
Attest:

Edward M. Fletcher, Jr.                             WILLIAM E. SCHUYLER, JR.
Attesting Officer                                          Commissioner of Patents